United States Patent [19]

Fukushima et al.

[11] 3,961,940
[45] June 8, 1976

[54] POST-TREATMENT OF ILMENITE ORE SUBJECTED TO SELECTIVE CHLORINATION TREATMENT

[75] Inventors: Seitaro Fukushima; Ariyoshi Saito; Fukuzo Kaneko, all of Omiya, Japan

[73] Assignee: Mitsubishi Kinzoku Kogyo Kabushiki Kaisha, Japan

[22] Filed: Nov. 15, 1974

[21] Appl. No.: 524,340

[30] Foreign Application Priority Data
Nov. 20, 1973  Japan................ 48-130468

[52] U.S. Cl. .................... 75/1 T; 75/2; 423/80; 423/85
[51] Int. Cl.² .............. C22B 1/00; C01G 23/00
[58] Field of Search........... 75/1 TI, 2; 423/80, 423/83, 85, 610

[56] References Cited
UNITED STATES PATENTS

| | | | |
|---|---|---|---|
| 2,954,278 | 9/1960 | Gaskin................ | 423/80 |
| 2,982,613 | 5/1961 | Griffin................ | 75/2 |
| 3,699,206 | 10/1972 | Dunn, Jr............. | 75/1 TI |
| 3,784,670 | 1/1974 | Yamada.............. | 423/80 |

*Primary Examiner*—M. J. Andrews
*Attorney, Agent, or Firm*—Wenderoth, Lind & Ponack

[57] ABSTRACT

Process for post-treating a chlorinated ilmenite ore which has undergone a selective chlorination treatment in the presence of a solid carbonaceous material, which comprises subjecting the chlorinated ilmenite ore to a magnetic separation in a high magnetic field to separate it into a magnetic portion and nonmagnetic portion, subjecting the residual of the solid carbonaceous material concentrated in the nonmagnetic portion to flotation, using a frothing agent such as methylisobutylcarbinol and a collector for a sulfide ore such as xanthate, Aerofloat or the like, and washing a gangue value partially liberated from the ilmenite ore with water or suspending it in water in said flotation to separate these materials respectively thereby to produce an artificial rutile with a $TiO_2$ content of at least 95% as a final product.

10 Claims, 3 Drawing Figures

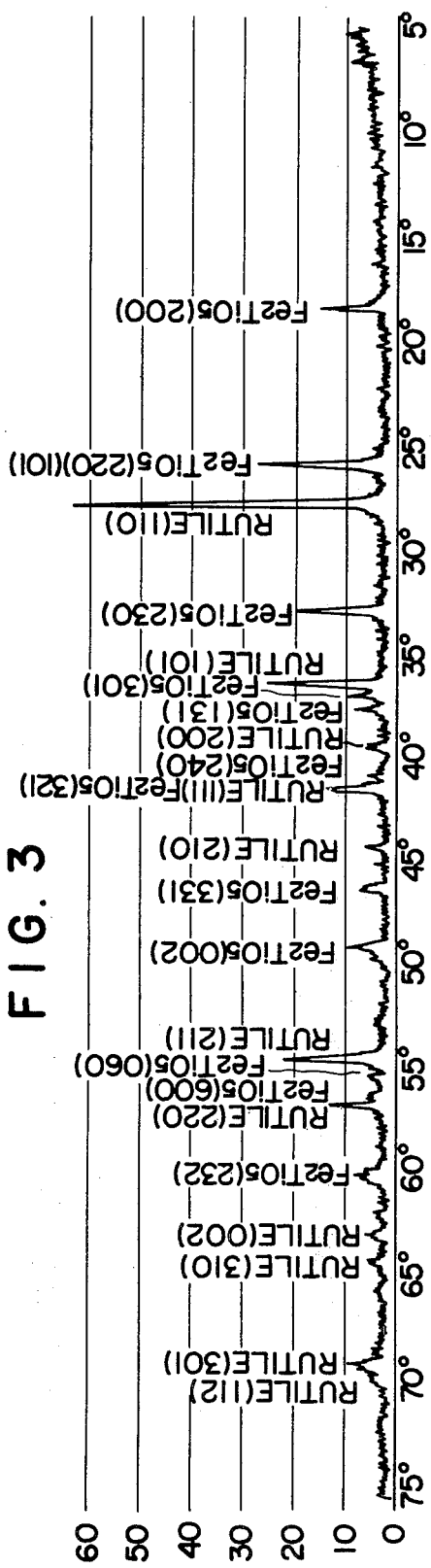
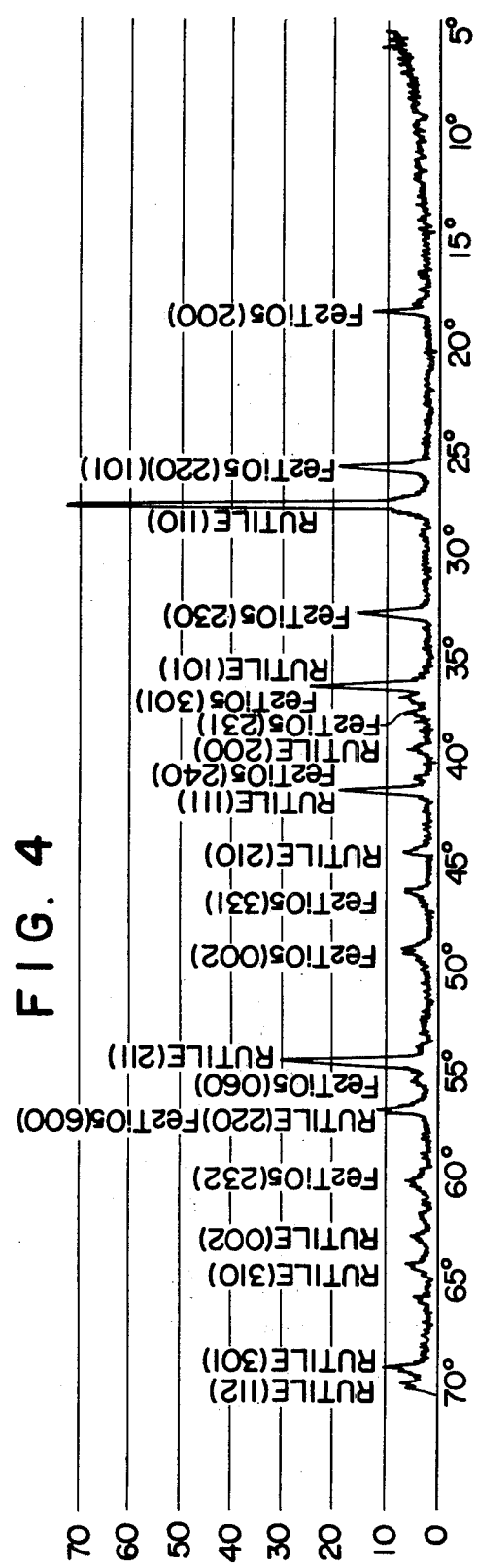
FIG. 3
FIG. 4

POST-TREATMENT OF ILMENITE ORE SUBJECTED TO SELECTIVE CHLORINATION TREATMENT

BACKGROUND OF THE INVENTION

The present invention relates to a process for post-treating an ilmenite ore subjected to a selective chlorination treatment wherein the ilmenite ore resulting from the chlorination furnace is separated from the unreacted ore (including the unreacted ore and partially reacted ore), solid carbonaceous materials and other impurities contained therein thereby to obtain an artificial rutile with a $TiO_2$ content of at least 95 % as a final product.

The term "ilmenite" herein used refers to common titaniferous iron ores having a wide range of compositions of titanium dioxide (hereinafter referred to as titanium oxide), and ferrous and ferric oxide.

A selective chlorination process for ilmenite ore is well known as a process for upgrading the ilmenite wherein the ilmenite ore is mixed with coke or other solid carbonaceous materials to form a mixture which is treated with chlorine gas to preferentially chlorinate the iron oxide contained in the ore, and titanium oxide is concentrated into the residue. Basically, the reaction control of this selective chlorination process depends on the preferential reaction between the iron oxide contained in the ilmenite ore and chlorine. There have been a number of patents on establishment of conditions such as the quantity of the solid carbonaceous material to be added, reaction temperature and the like, and regulation of these factors in order to stabilize such a selective reaction.

However, because chlorine reacts not only with the iron oxide contained in the ilmenite but also with the titanium oxide, the selective chlorination merely includes utilization of the relative difference in reactivity of chlorine with the iron oxide and the titanium oxide. As the chlorination reaction proceeds and the residual iron oxide reaches a certain limit value, chlorine begins to react with the titanium oxide, while the unreacted iron oxide remains intact.

Ordinarily, the chlorination furnace is operated in such a manner that the unreacted iron oxide exceeding the limit level is allowed to remain thereby to prevent the formation of titanium tetrachloride. Therefore, the ore discharging from the chlorination furnace contains the unreacted ore corresponding to the unreacted iron oxide or the partially reacted ore, and excessive solid carbonaceous materials which were not used for the chlorination reaction is discharged together therewith from the furnace. The mixed ore is too low in titanium value to use as a product. That is, in order to provide an artificial rutile having a $TiO_2$ content of at least 95%, separation of the unreacted ore and excessive solid carbonaceous material from the substantially completed reacted ore must be carried out.

In Japanese Laid-Open Publication No. 2657/71, a process for post-treating ilmenite ore removed from a chlorination furnace is disclosed which comprises carrying out the separation of the unreacted ore by magnetic separation. Also, Japanese Laid-Open Publication No. 4319/73 discloses a treating process including a combination of a magnetic separation process and a tabling process for separating coke and silica. On the other hand, Japanese Laid-Open Publication No. 33906/72 proposes separation of silica and alumina by subjecting the titanium concentrate resulting from the chlorination furnace to an electrostatic separator and separation of excessive coke by floatation or an electrostatic separation.

However, in the method described in Japanese Laid-Open Publication No. 2657/71, it is necessary to cool the ore from the chlorination furnace in a reducing atmosphere such as carbon monoxide or methane so that the iron contained in the ore is maintained at or converted to $FeO$ or $Fe_3O_4$, thereby magnetizing the remaining iron, and to maintain the remaining iron contained in the recovered ore from the furnace at a level of at least 5%, and preferably at least 10%, for example, 12% in order to prevent the formation of titanium tetrachloride. Therefore, when such an ore from the furnace is subjected to a magnetic separation, the separated ore inevitably contains a larger portion of magnetic materials. As a consequence, the combination of heat loss due to the recycling of the magnetic portion to the chlorination furnace and high temperature required to vaporize ferrous chloride having a high boiling point introduced from lower iron oxides make the maintenance of the chlorination furnace at the reaction temperature difficult.

Further, since the coke has a wide range of a particle size due to its consumption attendant on the chlorination reaction and a portion thereof always exhibits the same physical behavior as the ore when being subjected to a tabling or electrostatic separation, a complete separation thereof is impossible. The separation of coke by flotation ordinarily involves the use of a collector of hydrocarbon type such as kerosene. Since the coke subjected to the chlorination reaction has adsorbed various materials in the course of the treatment and the quantity of the materials absorbed varies with the reaction conditions, it is necessary to determine each flotation condition according to the influence of the adsorbing action of the coke, which is not necessarily easy, and the separation is thus unsatisfactory.

SUMMARY OF THE INVENTION

It is an object of the present invention to overcome the above described difficulties accompanying the conventional techniques and to provide a process for post-treating ilmenite ore which has undergone a selective chlorination treatment to recover therefrom an artificial rutile with a $TiO_2$ content of at least 95%, which is industrially advantageous.

The process of the present invention is characterized in that an ilmenite ore which has undergone a selective chlorination treatment and been taken from the chlorination furnace (hereinafter sometimes referred to as "chlorinated ilmenite ore" or "chlorinated ore") is subjected to a magnetic separation in a high magnetic field.

In accordance with another aspect of the process of the present invention, an excessive solid carbonaceous material concentrated into the non-magnetic portion resulting from the magnetic separation of the ilmenite ore is subjected to flotation with the use of a frothing agent and a collector for a sulfide ore, and gangue materials partially liberated from the ilmenite in the selective chlorination treatment is washed with water or suspended in water in the flotation to separate the carbonaceous material and the gangue respectively.

Thus, the present invention provides a process for separating by the magnetic separation the unreacted ore as a magnetic portion from the substantially completely created ore, both constituting the chlorinated ore which has undergone the selective chlorination treatment, by utilizing the difference in magnetic susceptability between hematite or pseudobrookite of paramagnetism remaining in the unreacted ore and rutile constituting most part of the substantially completely reacted ore in a high magnetic field. In the case where an artificial rutile having a higher content of $TiO_2$ is required, the non-magnetic portion consisting primarily of the completely reacted ore resulting from the magnetic separation is subjected to flotation with the use of a collector for sulfide ore, for example, zanthates or Aerofloat (commercial name, dithiophosphate type), and an excessive solid carbonaceous material contained in the non-magnetic portion is floated to separate it. At the same time, gangue materials such as silica and alumina liberated partially from the ilmenite ore in the selective chlorination treatment and ash separated from the solid carbonaceous material consumed is washed with water or suspended in water in the flotation as a slime to separate it, thereby yielding a high grade concentrate. In the magnetic separation process, the magnetic field is preferably not less than 15,000 gauss and particularly preferably not less than 20,000 gauss.

BRIEF DESCRIPTION OF THE DRAWINGS

The accompanying drawings (FIGS. 1–5) show X-ray diffraction patterns respectively, of the original ilmenite ore (1), its oxidizing roasted ore (2), and the portions resulting from the magnetic separation after the chlorination process, that is, the magnetic portion (3), the middling portion (4) and the non-magnetic portion (5).

DETAILED DESCRIPTION

Figure 1:
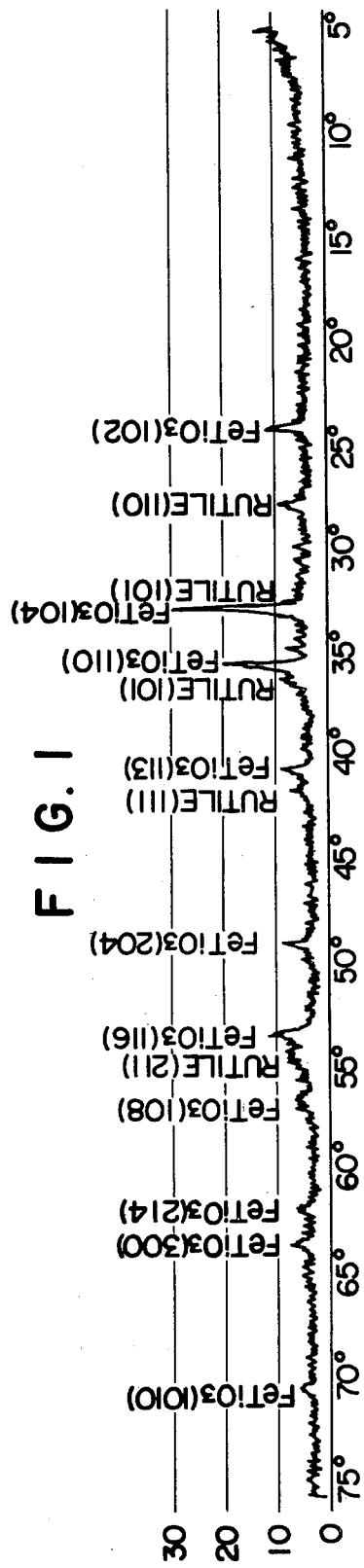

The nature, utility, and further features of the invention will be more fully apparent from the following detailed description beginning with a consideration of general aspects of the invention and concluding with specific examples of practice illustrating preferred embodiments of the invention. In the selective chlorination treatment, a raw ilmenite ore is first subjected to preoxidizing roasting. That is, the raw ore is passed through an oxidizing atmosphere at a temperature of 900° to 950°C to oxidize the ferrous oxide contained in the ore to ferric oxide, after which the oxidized ore is introduced into a fluidized-bed type chlorination furnace together with a solid carbonaceous material, such as calcined petroleum coke (hereinafter referred to as coke), in a quantity of 6 to 8% by weight based on the ore. The iron oxide contained in the ore reacts with chlorine blown into the furnace through the bottom thereof to form ferric chloride which is vaporized out of the furnace.

On the other hand, the ore which has undergone the selective chlorination treatment is continuously removed through a side wall of the furnace and supplied into a water cooled hopper wherein it is rapidly cooled. In this stage, the formation of titanium tetrachloride may be suppressed by so adjusting the quantity of the iron remaining in the recovered ore that it is in the range of 2 to 3 % in terms of Fe. The ore in the hopper is weighted and supplied to a dressing plant wherein it is passed through a magnetic separator having a magnetic field of at least 15,000 gauss and particularly preferably at least 20,000 gauss to separate the unreacted ore.

In the practice of the magnetic separation, the slight difference in magnetic susceptability in a high magnetic field between the paramagnetic material of hematite or pseudobrookite remaining in the unreacted ore and the completely reacted ore represented by rutile is utilized. When the unreacted ore having a high content of iron value is freely dropped through the magnetic separator, the passage of the unreacted ore is distorted in the direction of a magnetic pole, while the reacted ore falls vertically, so that they are separated from each other. It has been verified by X-ray diffraction analysis that the iron remaining in the unreacted ore separated as the magnetic material corresponds to hematite or pseudobrookite. This hematite or pseudobrookite has been present per se in the original ore or produced in the oxidizing roasting for pre-treating the raw ore.

In this way, the ilmenite is separated into a magnetic portion consisting mainly of the unreacted ore and a non-magnetic portion consisting mainly of the reacted ore by the magnetic separation. The magnetic portion is returned directly to the chlorination furnace for retreatment. The non-magnetic portion contains, in addition to the reacted ore, excessive coke and ash due to the coke consumed in the chlorination reaction or the gangue materials contained in the original ore in a concentrated state. Further, a weak magnetic portion (middling) which is intermediate between the magnetic portion and the non-magnetic portion is separated with a certain range of distribution.

Ordinarily, the middling portion is not removed in a single form but divided into the magnetic and non-magnetic portions by a separating plate positioned at a suitable position such that the middling portion is delivered to the non-magnetic portion at as high a ratio as possible within the permitted limit depending upon the desired content of $TiO_2$ in the artificial rutile as a product. As a result, the proportion of the magnetic portion to be returned to the chlorination furnace is in the range of from 10 to 25 % of the ore to be supplied to the furnace and it may sometimes exceed this limit depending on the operational conditions of the chlorination furnace.

On the other hand, although the coke transferred into the non-magnetic portion need not be separated in some cases, the coke is usually separated in order to up-grade the $TiO_2$ content, and the separated coke is recovered and, like the magnetic portion, is returned to the chlorination furnace for re-use. That is, when the non-magnetic portion is subjected to flotation with the use of a frothing agent such as methylisobutylcarbinol and a collector for sulfide ore such as xanthates or Aerofloat, the coke contained in the non-magnetic portion is floated and may be completely separated. Although the reason why such a collector compound generally used as a collector for sulfide ore in flotation provided the above-mentioned effect is not clear, it is conceivable that a small amount of sulfur compounds contained in the coke contributes to this effect.

As the collector for sulfide ore to be used in the present invention, the following compounds, all of which are ordinarily used as a collector for sulfide ore in flotation, are enumerated: xanthates representable by the general formula

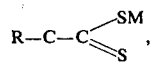

or dithiophosphates representable by the general formula

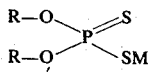

; wherein R is an alkyl group containing 2 to 5 carbon atoms and M is selected from sodium, potassium and allyl groups. One typical example of the dithiophosphates is sodium diethyldithiophosphate known under the commercial name of 'Aerofloat'.

The collector above-mentioned is used in a quantity per ton of the non-magnetic portion of from 10 to 500g, preferably from 100 to 200g.

The frothing agent to be used in the present invention is not specifically limited and, for example, the following compounds can be used without problem singly or in combination: methylisobutylcarbinol, pine oil and ethylene glycol.

The frothing agent is used in a quantity per ton of the non-magnetic portion of from 10 to 500g, preferably from 50 to 150g.

The artificial rutile is recovered as the flotation tailing, while the finely divided coke adhering to the surface of the ore or the ash separated from the coke and the gangue materials such as silica and alumina present as the impurities of the original ore are liberated as finely divided particles under the free state thereof from the ore by the abrasive action between the ores during the flotation operation. The coke floats up and the gangue is suspended in water and separated as a slime. The slime is filtered, and the filtrate, water, is repeatedly used, while the tailing, artificial rutile, is dried to give a product with a $TiO_2$ content of at least 95%. In addition, if the non-magnetic portion is subjected to a water washing operation as pre-treatment for the flotation, the impurities including the gangue such as silica and alumina can be suspended in water and separated as a slime.

Further, when the flotation of the coke is not sufficient according to the reaction feature of the selective chlorination in the flotation operation mentioned above, a better separation of the coke is effected by subjecting the flotation tailing to a scavenging operation. In this scavenging operation, there is used as a scavenging solution an aqueous solution which contains 5 to 100g, preferably 20 to 50g, per ton of non-magnetic portion of an alkylamine derivative selected from alkylamine acetates and alkylamine hydrochlorides, each alkyl group containing 8 to 18 carbon atoms, and/or 10 to 500g, preferably 50 to 200g, per ton of non-magnetic portion of kerosene. The use of an excess alkylamine derivative is not desirable since it is liable to cause a titanium value to float along with coke. This scavenging operation is conducted in a vessel, preferably in a type of floating machine.

While the general nature and effectiveness of this invention will be apparent from the foregoing description, the features of the present invention in comparison with the conventional techniques are as follows.

1. Since the magnetic separation utilizes the paramagnetism of the hematite or pseudobrookite remaining in the unreacted ore, the separated magnetic portion can be returned directly to the chlorination furnace without being subjected to further pre-oxidizing roasting of the ore.

2. When the treated ore is removed from the chlorination furnace, a portion of the unreacted ore is inevitably mixed into the reacted ore because of the inherent property of the fluidized-bed type reaction furnace. However, since the unreacted ore can be easily separated by means of a magnetic separator, it is unnecessary to carry out the removal of the iron value beyond the limit of the selective chlorination in the chlorination furnace, and, thus, the chlorination furnace operation is facilitated.

3. Calcium oxide, magnesium oxide, and the like contained in the original ore are converted into the corresponding chlorides during the chlorination reaction, and the resulting non-volatile chlorides such as calcium chloride, magnesium chloride and the like are dissolved into water in the flotation process or the water washing process as the pretreatment, so that these chlorides are not mixed into the artificial rutile as a product.

4. A portion of the gangue materials such as silica, alumina, and the like contained in the original ore is separated, while the same phenomenon is observed with chromium oxide considered to be present in combination with the iron oxide in the original ore. That is, when the iron oxide combined with the chromium oxide is removed, the chromium oxide is isolated in a single form and removed in the flotation process.

5. The phenomenon that the ore is finely divided in the chlorination process and the post treatment process is in no way observed, and the particle size of the treated ore remains almost the same as that of the original ore. On the other hand, the powdery coke, coke ash and the gangue value of the original ore adhere to the chlorinated ore as finely divided particles, but these are separated in the flotation process, and, thus, the resulting product is an artificial rutile having a uniform particle size and a beautiful appearance.

As mentioned above, the present invention provides a process for post-treating an ilmenite subjected to a selective chlorination treatment wherein the unreacted ore, coke, coke ash, or the gangue materials partially liberated from the original ore contained in the ilmenite which has undergone the selective chlorination treatment are separated by a magnetic separation, flotation, or a combination of a water washing process and flotation to obtain an artificial rutile with a $TiO_2$ content of at least 95 % as a final product. Thus, the process of the present invention is considered to have high utility for industrial purposes.

The utility and advantageous features of the present invention will be further illustrated by the following experimental examples, which are illustrative only and are not intended to limit the scope of the present invention.

EXAMPLE 1

693 kg of an ilmenite ore removed from a chlorination furnace was subjected to magnetic separation and flotation, whereupon the results shown in Table 1 were obtained. More specifically, the ilmenite ore was subjected to the magnetic separation by passing it through a magnetic separator whose poles was opposed to each other in a field of 20,000 gauss to divide the ore into a magnetic portion and a non-magnetic portion. The magnetic portion which was in a proportion of 14.7 % by weight with respect to the ore to be supplied to the chlorination furnace was returned to the chlorination furnace for re-treatment.

Figure 2:
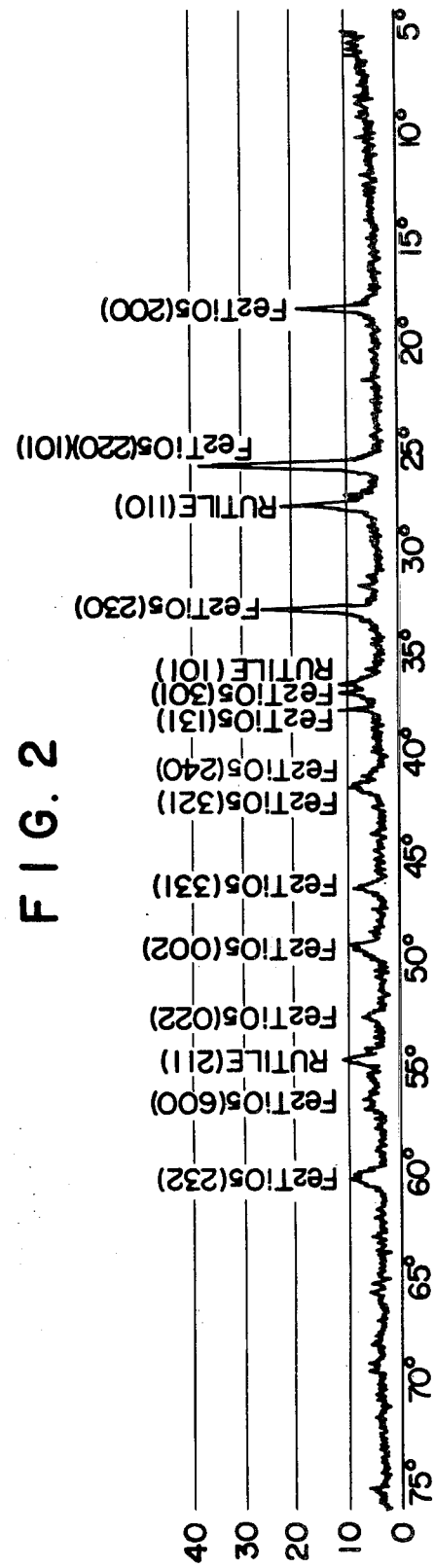
Figure 5:
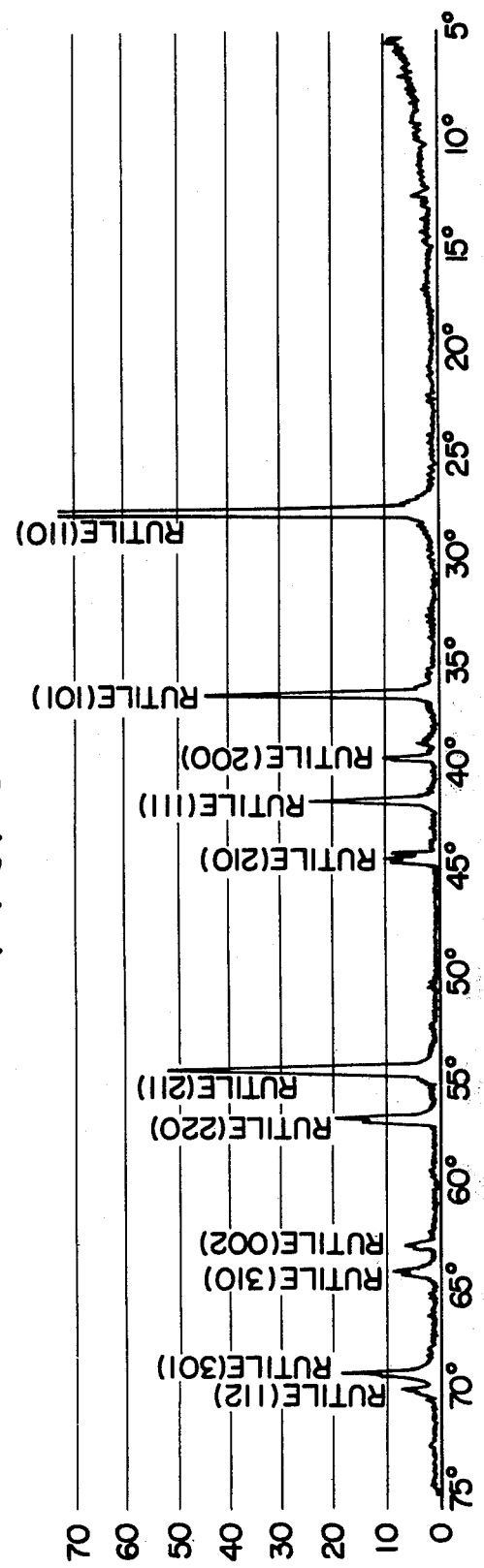

The accompanying drawings show X-ray diffraction patterns relating to the respective sample of (1) an original ilmenite ore, (2) an oxidizing-roasted ore, (3) a magnetic portion, (4) a middling portion and (5) a non-magnetic portion, the last three portions being obtained by processing the selective chlorination treated ore in the magnetic separator. The samples are illustrated in FIGS. 1 to 5 of the drawings, respectively. The X-ray diffraction patterns indicate that the remaining iron in the unreacted ore separated from the ilmenite which has undergone the selective chlorination treatment consists mainly of pseudobrookite.

The conditions of the X-ray diffraction analysis pertaining to all of FIGS. 1 to 5 are as follows:

| | |
|---|---|
| Target | : Cu |
| Filter | : Ni |
| Voltage | : 30 KVP |
| Current | : 20 mA |
| Count Full Scale | : $4 \times 10^2$ c/s |
| Time Constant | : 1 sec. |
| Scanning Speed | : 2°/min. |
| Chart Speed | : 2 cm/min. |
| Receiving Slit | : 0.2 mm. |

The non-magnetic portion separated in the above magnetic separation process was introduced into a conditioning bath, and potassium amyl zanthate and methylisobutylcarbinol were added in quantities of 200 g/ton and 100 g/ton of the non-magnetic portion respectively, thereto. The resulting mixture at a pulp concentration of 10 % was subjected to flotation by using an Agitayer type floating machine. As a result, coke corresponding to about 3 % of the supplied ore was floated and recovered, and as a tailing, an artificial rutile with a $TiO_2$ content of 95 % was obtained in a yield of 82 % and in a net yield of $TiO_2$ of 89 %. In this connection, results of analysis of a slime separated from the tailing suspended in water are shown in Table 2.

Table 2

| | | Analysis of slime separated by flotation | | | | | | |
|---|---|---|---|---|---|---|---|---|
| $TiO_2$ | Fe | MnO | $SiO_2$ | $Al_2O_3$ | $V_2O_5$ | $Cr_2O_3$ | C |
| 58.2 | 1.64 | 0.14 | 18.7 | 20.1 | <0.1 | 0.41 | 0.11 |

EXAMPLE 2

279 kg of an ilmenite ore which had undergone a selective chlorination treatment was subjected to a magnetic separation by using a magnetic separator whose poles are opposed to each other in a field of 25,000 gauss to obtain 28.7 kg of a magnetic portion and 250.3 kg of a non-magnetic portion. The non-magnetic portion to which Aerofloat and methylisobutylcarbinol had been added in quantities of 130 g/ton and 50 g/ton of the non-magnetic portion respectively, was subjected to flotation by using an Agitayer type floating machine to recover 241.9/kg of an artificial rutile with a $TiO_2$ content of 95.5% as a tailing. The net yield of $TiO_2$ was 91.4%.

The results of the above magnetic separation and flotation are shown in Table 3.

Table 3

| | Result of 25,000 gauss magnetic separation and Aerofloat flotation | | | | | |
|---|---|---|---|---|---|---|
| Kind of ore | Weight (kg) | Weight distribution (%) | Analytical value (%) | | | $TiO_2$ distribution (wt. %) |
| | | | $TiO_2$ | Fe | MnO | |
| Supply ore | 279 | 100 | 90.6 | 2.13 | 0.07 | 100 |
| Magnetic portion | 28.7 | 10.3 | 70.4 | 14.2 | 0.41 | 8.0 |
| Non-magnetic portion | 250.3 | 89.7 | 92.9 | 0.74 | 0.03 | 92.0 |
| Froth | 5.77 | 2.07 | 1.76 | 0.53 | 0.04 | 0.04 |
| Slime | 2.73 | 0.98 | 51.5 | 1.42 | 0.08 | 0.56 |
| Tailing | 241.9 | 86.7 | 95.5 | 0.74 | 0.03 | 91.4 |

EXAMPLE 3

The same ilmenite ore removed from a chlorination furnace used in Example 1 was subjected to magnetic separation under the same conditions as in Example 1. 100kg of the non-magnetic portion separated by the above magnetic separation was mixed with potassium amyl xanthate and methylisobutylcarbinol in quantities of respectively 150g and 100g, per ton of the non-magnetic portion, and the resulting mixture adjusted at a pulp concentration of 10% was subjected to flotation by using an Agitayer type floating machine. The tailing from the flotation was further subjected to a scavenging operation with the use of lourylamine hydrochloric acid salt and kerosene in quantities of 50g and 100g respectively, per ton of the non-magnetic portion, at a pulp concentration of 10% in another Agitayer type floating machine.

Table 1

| | Result of 20,000 gauss magnetic separation and xanthate flotation | | | | | |
|---|---|---|---|---|---|---|
| Kind of ore | Weight (kg) | Weight distribution (%) | Analytical value (%) | | | $TiO_2$ distribution (wt. %) |
| | | | $TiO_2$ | Fe | MnO | |
| Supply ore | 693 | 100 | 88.2 | 2.86 | 0.26 | 100 |
| Magnetic portion | 102 | 14.7 | 63.3 | 13.8 | 0.93 | 10.5 |
| Non-magnetic portion | 591 | 85.3 | 92.6 | 0.96 | 0.12 | 89.5 |
| Froth | 18.9 | 2.72 | 19.1 | 0.98 | 0.14 | 0.6 |
| Slime | 3.37 | 0.58 | 58.2 | 1.64 | 0.14 | 0.3 |
| Tailing | 568.1 | 82.0 | 95.3 | 0.96 | 0.12 | 88.6 |

The final results with respect to titanium dioxide of the above separation are shown in Table 4 with respect to titanium.

Table 4

| Kind of ore | Results of scavenging operation | | | TiO$_2$ distribution |
|---|---|---|---|---|
| | Weight (kg) | Weight distribution (%) | TiO$_2$ content (%) | (wt. %) |
| Flotation feed (non-magnetic) | 100 | 100 | 92.2 | 100 |
| Froth | 3.51 | 3.51 | 20.0 | 0.8 |
| Slime | 0.71 | 0.71 | 16.8 | 0.1 |
| Tailing | 95.8 | 95.8 | 95.4 | 99.1 |

What is claimed is:

1. In a process for upgrading an ilmenite ore containing gangue materials to produce an artificial rutile comprising chlorinating the ilmenite ore in the presence of a solid carbonaceous material whereby the larger part of the iron value in the ilmenite ore is selectively chlorinated into chlorides thereof which are evaporated off during the chlorination under conditions which leave the titanium value in the ilmenite ore unchlorinated in the resulting chlorinated ilmenite ore, the improvement which comprises:
   1. subjecting said resulting chlorinated ilmenite ore to magnetic separation in a high-intensity magnetic field, thereby to separate a magnetic portion and a non-magnetic portion of the chlorinated ilmenite ore, and then
   2. subjecting the non-magnetic portion to flotation with the use of a frothing agent, and a collector selected from the group consisting of xanthates represented by the general formula

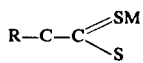

and dithiophosphates represented by the general formula

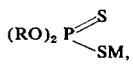

wherein R is an alkyl group containing 2 to 5 carbon atoms and M is a member selected from the group consisting of sodium, potassium and allyl, thereby to separate the residual of the solid carbonaceous material concentrated in the non-magnetic portion and a part of the gangue materials liberated from the ilmenite ore, and to obtain an artificial rutile of high titanium content as a tailing portion from the flotation.

2. The process according to claim 1 wherein said collector for sulfide ore is used in a quantity ranging from 10 to 500g per ton of said non-magnetic portion, and said frothing agent is used in a quantity ranging from 10 to 500g per ton of said non-magnetic portion.

3. The process according to claim 1 wherein the magnetic field is at least 15,000 gauss.

4. The process according to claim 1 wherein the magnetic field is at least 20,000 gauss.

5. The process according to claim 1 wherein the iron component contained in said ilmenite is essentially in the form of an iron component selected from the group consisting of hematite, pseudobrookite and mixtures thereof.

6. The process according to claim 1 wherein said non-magnetic portion is washed with water prior to said flotation.

7. The process according to claim 1, wherein said residual of the solid carbonaceous material originates from petroleum coke used as the solid carbonaceous material used in said selective chlorination and consists of the unconsumed petroleum coke and ash produced from the consumed petroleum coke, and the unconsumed coke floats up to be recovered and the ash is withdrawn along with said gangue value from the suspension layer in said flotation.

8. The process according to claim 1 wherein the frothing agent is a compound selected from the group consisting of methylisobutylcarbinol, pine oil and ethylene glycol.

9. The process according to claim 1 wherein said tailing portion from the flotation is further subjected to a scavenging operation in a scavenging solution containing an alkylamine derivative having an alkyl group of 8 to 18 carbon atoms selected from the group consisting of alkylamine acetates and alkylamine hydrochlorides in a quantity ranging from 5 to 100g per ton of said non-magnetic portion, thereby to cause a part of the solid carbonaceous material still remaining in said tailing portion from the flotation to float up, and to obtain an artificial rutile of still higher titanium dioxide content as a tailing portion from the scavenging operation.

10. The process according to claim 9 wherein said scavenging solution further contains kerosene in a quantity ranging from 10 to 500g per ton of said non-magnetic portion.

* * * * *